(12) United States Patent
Oxenknecht et al.

(10) Patent No.: US 8,985,638 B2
(45) Date of Patent: Mar. 24, 2015

(54) STACKED WASHER SLIP JOINT SEAL

(75) Inventors: Ernest Oxenknecht, Naperville, IL (US); Tom Plunkett, Aurora, IL (US); Frank Popielas, Plainfield, IL (US); Kevin Shaver, Chicago, IL (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 101 days.

(21) Appl. No.: 13/440,121

(22) Filed: Apr. 5, 2012

(65) Prior Publication Data

US 2013/0093181 A1 Apr. 18, 2013

Related U.S. Application Data

(60) Provisional application No. 61/472,696, filed on Apr. 7, 2011.

(51) Int. Cl.
*F16L 27/12* (2006.01)
*F16L 21/03* (2006.01)
*F01N 13/18* (2010.01)
*F16L 51/00* (2006.01)

(52) U.S. Cl.
CPC ............. *F16L 21/03* (2013.01); *F01N 13/1827* (2013.01); *F16L 51/00* (2013.01)
USPC ............................ 285/300; 285/223; 285/302

(58) Field of Classification Search
USPC ......... 285/374, 298, 299, 226, 227, 228, 223, 285/237, 302, 300; 60/322
See application file for complete search history.

(56) References Cited

U.S. PATENT DOCUMENTS

| | | | | |
|---|---|---|---|---|
| 2,407,745 A | * | 9/1946 | Jacobson | 285/278 |
| 2,534,123 A | | 12/1950 | Hasselhorn | |
| 3,692,337 A | * | 9/1972 | Mischel | 285/226 |
| 6,220,605 B1 | | 4/2001 | Becker, Jr. | |
| 6,860,487 B2 | | 3/2005 | Shiokawa, et al. | |
| 6,902,204 B2 | * | 6/2005 | Atanasoski et al. | 285/226 |
| 7,134,648 B1 | | 11/2006 | Rode | |
| 7,331,612 B2 | | 2/2008 | Frost et al. | |
| 2008/0012296 A1 | | 1/2008 | Johnston | |

FOREIGN PATENT DOCUMENTS

| | | |
|---|---|---|
| DE | 4136799 | 5/1993 |
| DE | 19718406 | 11/1998 |
| DE | 20012679 | 12/2000 |
| JP | 58033722 | 3/1983 |
| JP | 59085320 | 6/1984 |
| JP | 62023517 | 1/1987 |
| JP | 5231574 | 9/1993 |
| JP | 20011021077 | 1/2001 |

* cited by examiner

*Primary Examiner* — David E Bochna
(74) *Attorney, Agent, or Firm* — Marshall & Melhorn, LLC (57) ABSTRACT

Slip joint having a stacked washer seal, a male part and a female part. The female part has a small and a large inner diameter. The male part has substantially constant inner and outer diameters and a ring on the outer diameter. A gap is located between the male and female part. At least two washers and a flat shim are located in the gap. Each washer and flat shim has a first side, a second side, a first end and a second end. The first side of a first washer abuts an end of the male part. A second side of the washer contacts a first side of a flat shim. The second side of the shim contacts the first side of a second washer. The second side of the second washer contacts a first side of a second flat shim or an end of the female part.

15 Claims, 9 Drawing Sheets

STACKED WASHER SLIP JOINT SEAL

CROSS-REFERENCE TO RELATED APPLICATION

This application is a non-provisional application filed off of U.S. patent application Ser. No. 61/472,696 filed on Apr. 7, 2011, which is incorporated by reference in its entirety herein. This non-provisional application is being filed during the pendency of U.S. patent application Ser. No. 61/472,696.

FIELD OF THE INVENTION

The present invention relates to a slip joint with a stacked washer seal for use in an exhaust system of an internal combustion engines.

BACKGROUND OF THE INVENTION

Slip joints are designed to allow exhaust system parts to move with respect to one another. Such movement may be due to thermal expansion and/or movement from different parts of the vehicle. The joint permits movement between the exhaust system parts so that they are not damaged and the parts they are connected to, such as the engine, is not damaged. This permitted movement is especially important in heavy duty diesel engines due to the increased length of the exhaust manifold.

There are varying known techniques used to allow the joints to move. One method connects one part with another without a specific sealing component. Of course, this method permits emissions to escape between the two parts. It is expected that this method will no longer be permitted or available in the future with increased restrictions on emissions. Additionally, particulates in the emissions become stuck between the components. The particulates stick together then stick the parts together. Once the parts are stuck together they are not able to move with respect to one another, as they should. Once the parts are stuck together it makes them impossible to service. This method can also be disadvantageous because it can require welding operations and/or large amounts of force to connect the parts.

Another known method utilizes split rings between two parts. However, the rings are expensive, precision parts that require special hardware machining. Further, they only result in average sealing performance between the parts. Additionally, the quality that provides them some sealing capability also increases friction between the mated parts, thus impeding the sliding function of the joint.

Another method comprises the use of bellows. Bellows may provide a good seal, but the material can be expensive and its installation is inconvenient. At the least they are known to be bulky and heavy. Further, there are concerns about the durability of the bellows material. Lastly, bellows only seal against the escape of hot gases after the gases have traveled through the joint itself. This exposes the joint to high temperatures that can damage hardware and permit exhaust particulates an opportunity to become stuck in the joint. Particulates that become stuck in the joint may impede the function of the joint, and prevent movement of the parts with respect to one another as discussed above.

In view of the disadvantages of the known sealing means, it would be advantageous to provide a means to prevent exhaust gases from escaping between two parts and to permit the two parts to slip with respect to one another to at least accommodate thermal expansion. Further, it would be advantageous to provide a joint that requires less hardware preparation, that is easy to install, including installation by hand, that is lightweight, does not take up much space and is easy to maintain or replace.

SUMMARY OF THE INVENTION

The present invention is directed toward a slip joint with a stacked washer seal having a first male part and a second female part. The female part has a small inner diameter portion and a large inner diameter portion. The diameter portions are unitary with one another and directly beside one another. The male part comprises substantially constant inner and outer diameters, with the inner diameter being substantially equal to the small inner diameter portion of the female part. The male part comprises a ring located on the outer diameter. A gap is located between the male part and the female part. At least two washers and at least one flat shim are located in the gap. Each washer and each flat shim have a first side, a second side, a first end and a second end. The first side of a first washer abuts an end of the male part or a carrier, and the second side of the first washer is in direct contact with a first side of the flat shim. The second side of the flat shim is in direct contact with the first side of a second washer. The second side of the second washer is in direct contact with a first side of a second flat shim or an abutting end of the female part. The carrier has a tubular portion and an upstanding flange portion. The tubular portion has a substantially constant inner and outer diameter. The flange portion is unitary with the tubular portion and extends radially outward from the tubular portion at approximately 90 degrees.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless expressly stated otherwise.

Figure 1:
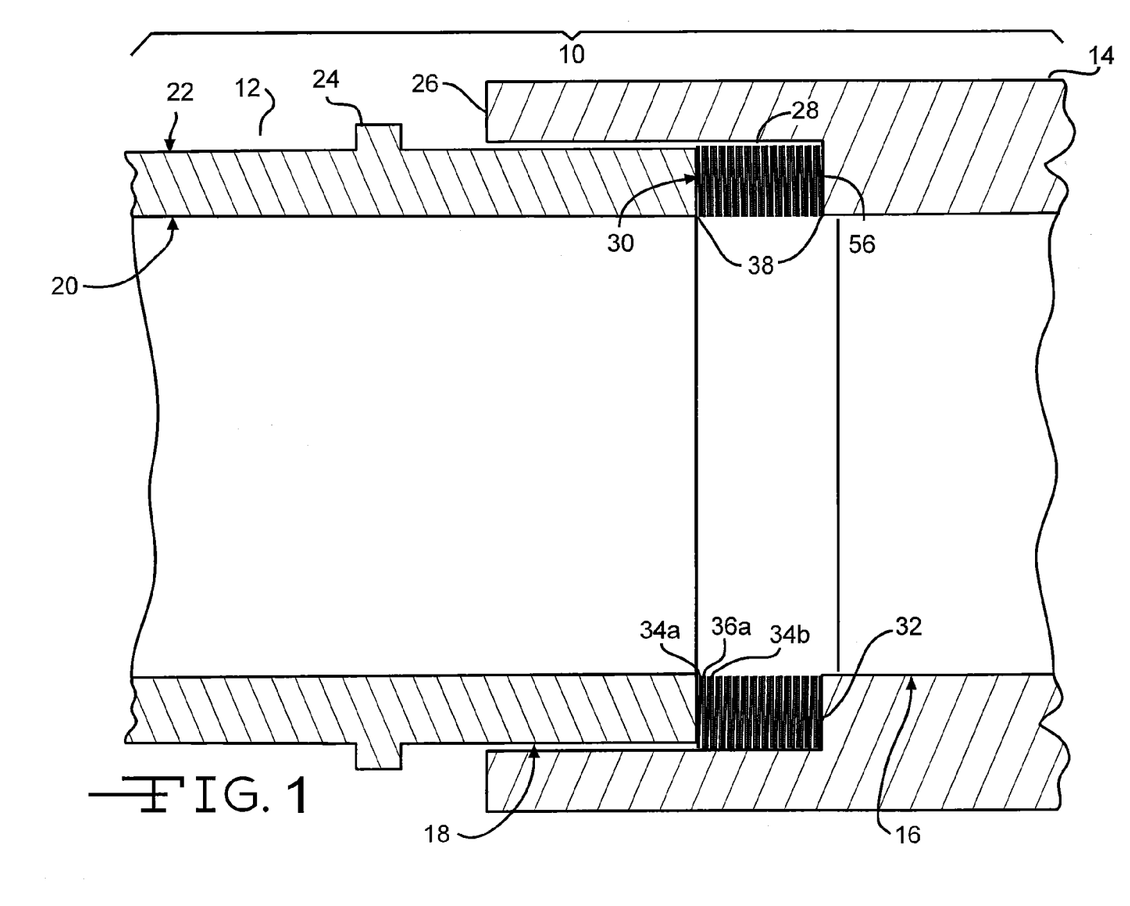
FIG. 1 is a cross-sectional view of a slip joint and the stacked washer seal.

A slip joint 10 is comprised of two parts, a first male part 12 and a second female part 14 as depicted in FIG. 1. It is desirable for the parts 12, 14 to be able to selectively move with respect to one another. The parts 12, 14 may be tubular in nature, each with a hollow interior. It is preferred that the interiors are in fluid communication with one another. The parts 12, 14 may be, by way of example, parts of an exhaust system (not shown) for a vehicle. The parts 12, 14 communicate exhaust gases from an internal combustion engine (not shown), such as a diesel engine, away from the engine.

Figure 4:
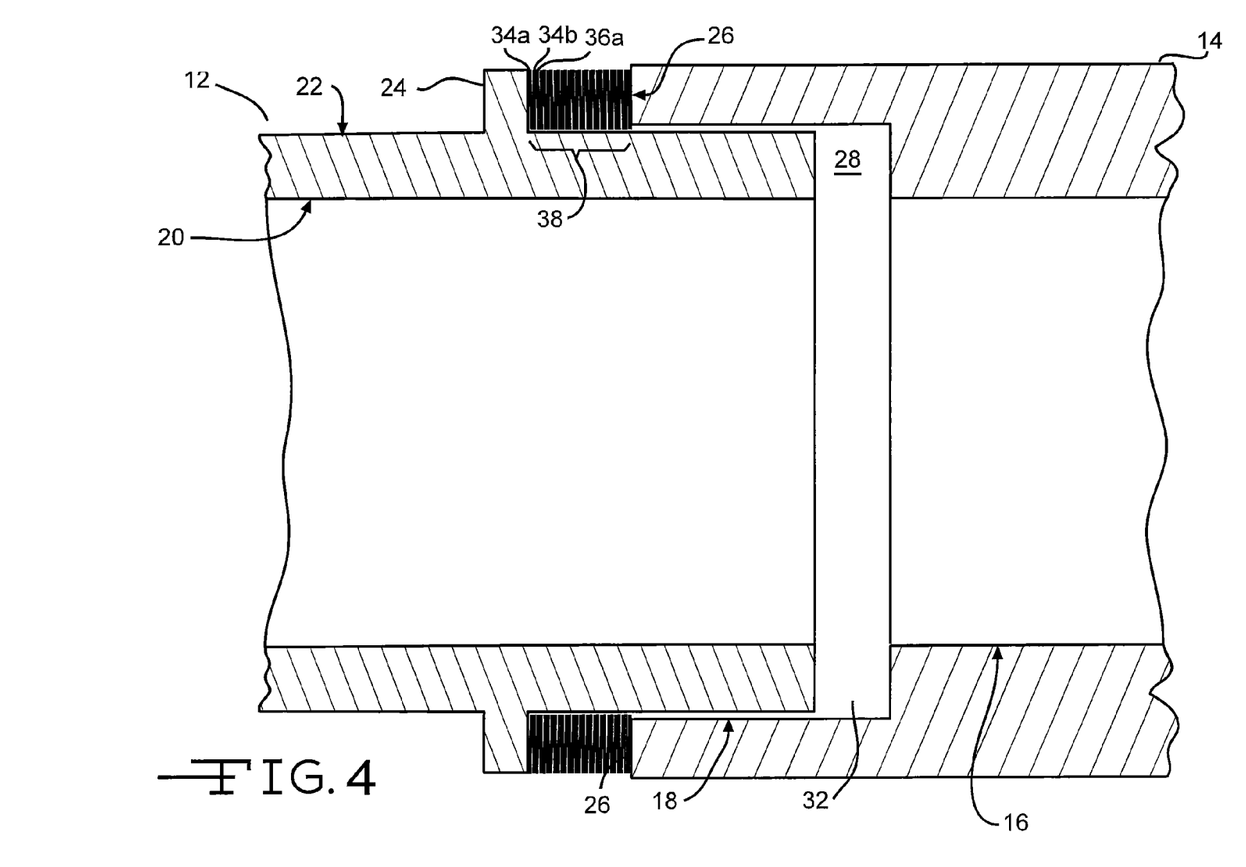
FIG. 4 is a cross-sectional view of another embodiment of FIG. 1.
Figure 5:
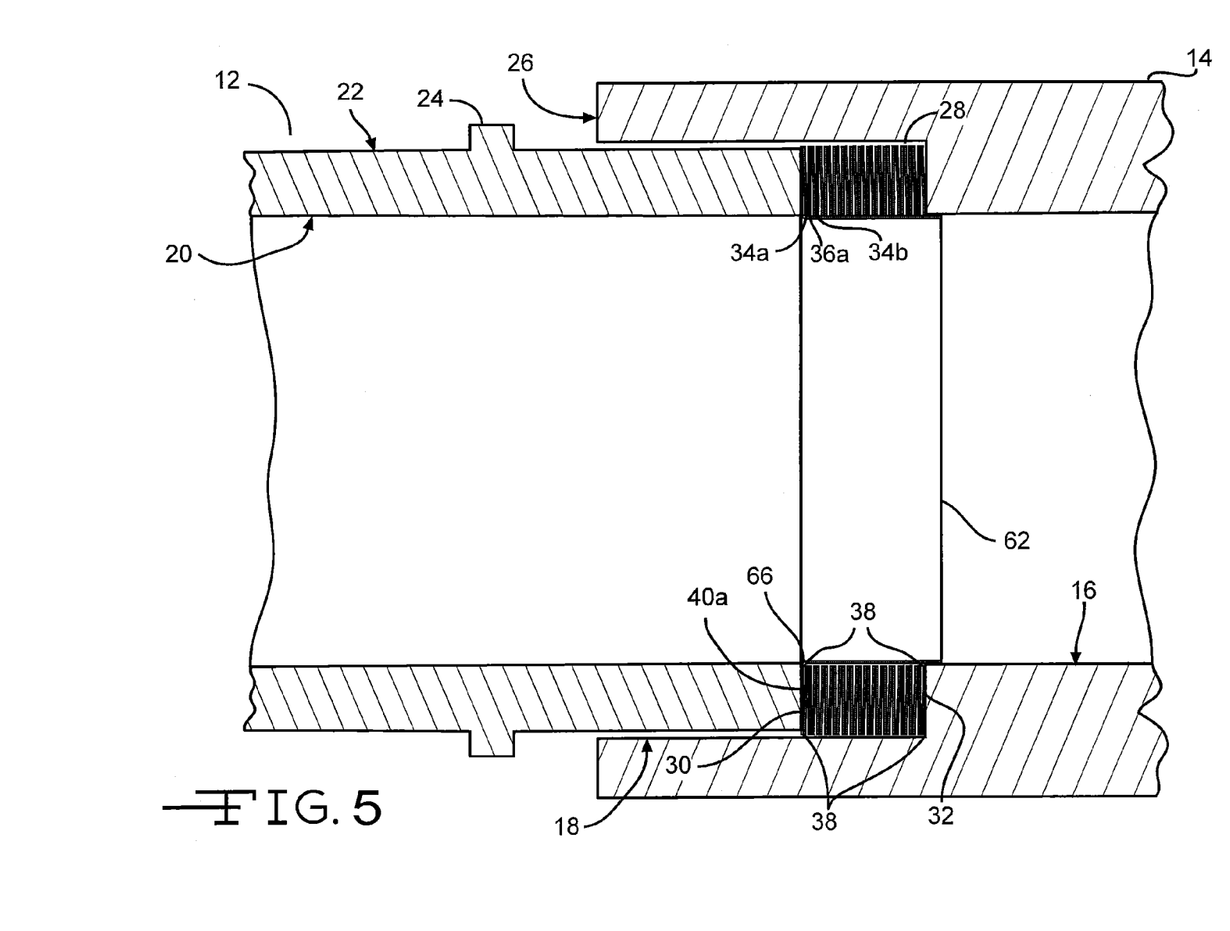
FIG. 5 is a cross-sectional view of another embodiment of FIG. 1.

As depicted in FIGS. 1, 4 and 5, the female part 14 has a small inner diameter portion 16 and a large inner diameter portion 18. Preferably, the two portions 16, 18 are unitary with one another and directly beside one another. The male part 12 may be substantially constant in its inner 20 and outer 22 diameters. The male inner diameter 20 may be the same or substantially equal to said small inner diameter portion 16 of the female part 12. The male outer diameter 22 is larger than the female smaller inner diameter 16, but substantially equal to the female larger inner diameter portion 18.

A ring 24 may be located on the outer diameter 22 of the male part 12. The ring 24 is designed to function as a stop. More particularly, the ring 24 may selectively abut an end surface 26 of the female part 14 to prevent the male part 12 from moving too far with respect to the female part 14.

A gap 28 is located between an end 30 of the male part 12 and a transition area 32 between the small inner diameter portion 16 and the large inner diameter portion 18 of the female part 14. At least two washers 34a, 34b, and at least one flat shim 36 act as a seal 38 and may be located in the gap 28, as depicted in FIGS. 1 and 5.

Figure 2:
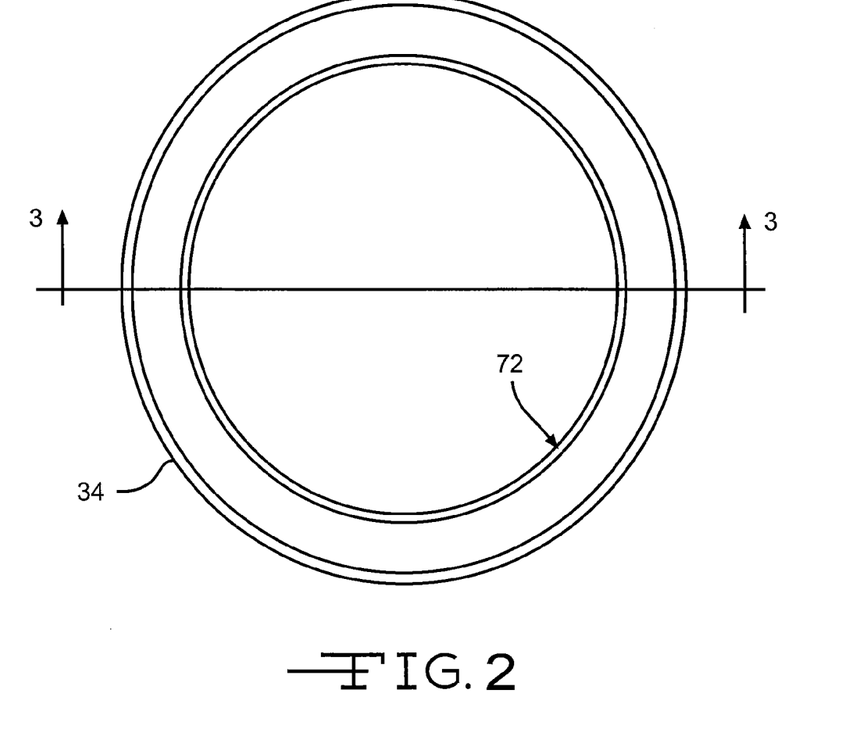
FIG. 2 is a top view of a washer.
Figure 3:
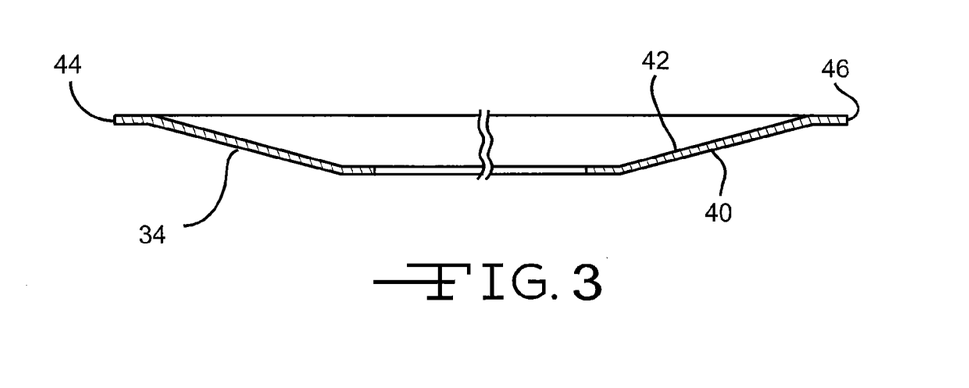
FIG. 3 is a cross-sectional view of the washer in FIG. 2 along line 3-3.

The washer 34, as depicted in FIGS. 2 and 3, may be Bellville washers. A Bellville washer is a type of spring shaped like a washer. It has a frusto-conical shape, i.e.; in the depicted embodiment the area about the center and the center opening extends away at an angle that is not planar with the center. This feature gives the washer 34 a spring characteristic. Some properties of Belleville washers include: high fatigue life, better space utilization, low creep tendency, and high load capacity with a small spring deflection.

Figures 11, 12, 13:
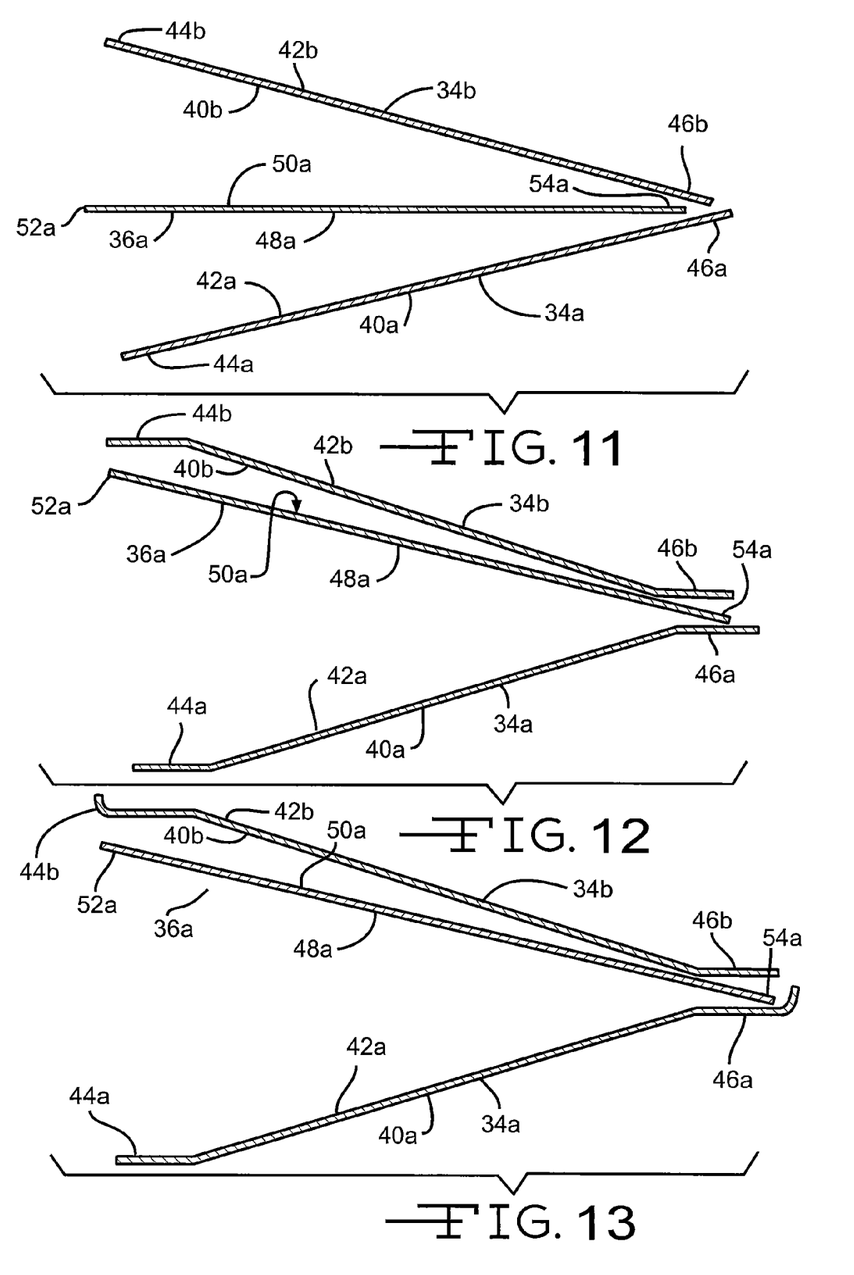
FIG. 11 is a partial cross-sectional view of washers with a flat shim.
FIG. 12 is a partial cross-sectional view of different washers with a flat shim.
FIG. 13 is a partial cross-sectional view of different washers with a flat shim.

As depicted in FIG. 3, each washer 34 comprises a first side 40, a second side 42, a first end 44 and a second end 46. Similarly as depicted in FIGS. 11-13, each flat shim 36 comprises a first side 48, a second side 50, a first end 52 and a second end 54.

Figure 9:
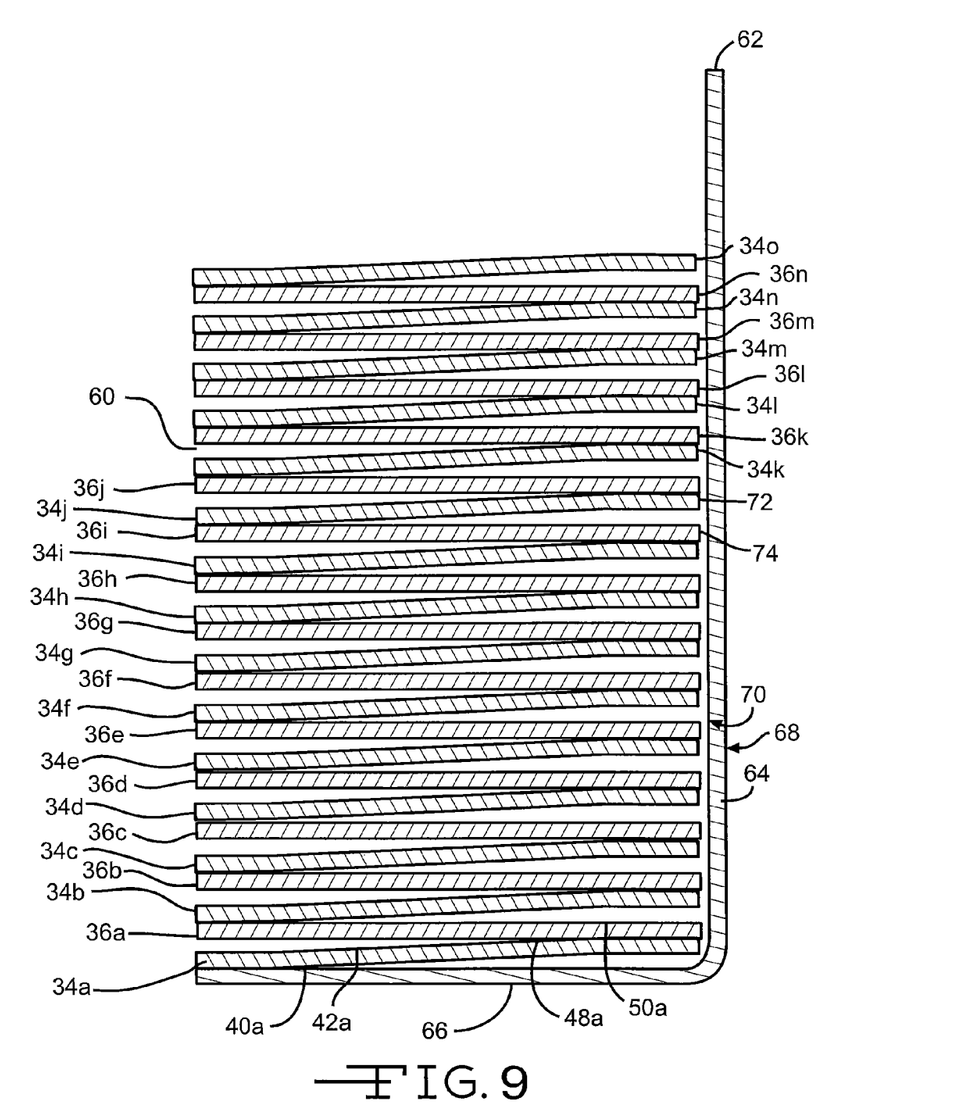
FIG. 9 is an enlarged cross-sectional view of the stacked washer seal and carrier.

To create the seal 38 as depicted in FIG. 9, the second side 42a of the first washer 34a is in direct contact with a first side 48a of a flat shim 36a. The second side 50a of the flat shim 36a is in direct contact with the first side 40b of a second washer 34b, and the second side 42b of the second washer 34b may be in direct contact with a first side 48b of a second flat shim 36b. This configuration continues for as many washers 34 and shims 36 are required to create the seal 38 needed for a particular application. As depicted in FIG. 1, the seal 38 abuts the end 30 of the male part 12 and the transition area 32 of the female part 14.

Preferably, a plurality of washers 34 are arranged in a series configuration, where each washer 34 is separated and supported by a flat shim 36, as depicted in FIG. 9. The number and orientation of the washers 34 and flat shims 36 may be changed from the depicted embodiment to customize the seal 38 for particular applications. For example, greater or fewer washers 34 may be used and they may be in series, in parallel or in combinations of series and parallel.

More particularly, multiple Belleville washers 34 may be stacked to modify the spring constant or amount of deflection. Stacking in the same direction will add the spring constant in parallel, creating a stiffer joint (with the same deflection). Stacking in an alternating direction is the same as adding springs in series, resulting in a lower spring constant and greater deflection. Mixing and matching directions allow a specific spring constant and deflection capacity to be designed.

Figure 10:
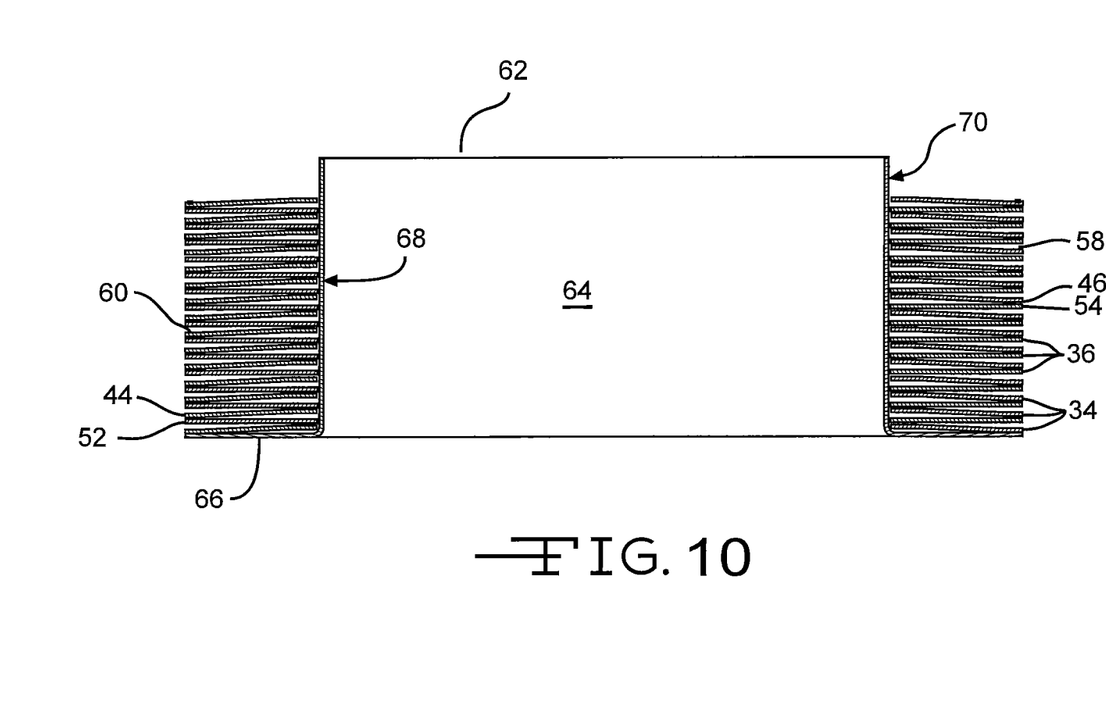
FIG. 10 is a cross-sectional view of the carrier with stacked washer seal.

Also as depicted in FIG. 10, the first end 44 of a washer 34 and the first end 52 of a flat shim 36 may be in direct contact with each other. Alternatively, the second end 46 of a washer 34 and the second end 54 of a flat shim 36 may be in direct contact with each other. Additionally, a selective gap 58 may be located between the second end 46 of a washer 34 and the second end 54 of a flat shim 36, or a second selective gap 60 may be located between the first end 44 of a washer 34 and the first end 52 of a flat shim 36.

As depicted in FIG. 1 and described above, the seal 38 is located in the gap 28 between the male and the female parts 12,14. It can be appreciated that when the slip joint 10 expands, the seal 38 compresses and the sealing stress points increase. Placement of the seal 38 in this location prevents exhaust gases from escaping through the gap 28 without disrupting the slip function of the slip joint 10.

This particular location of the seal 38 in the gap 28 can be advantageous at least for the following reasons. The seal 38 blocks hot exhaust gases from entering the slip joint 10 and causing oxidation damage to the larger inner diameter portion 18 of the female part 14 and the outer diameter 22 of the male part 12. A bound or oxidized slip joint is no longer a slip joint and can lead to further motion-induced damage to engine hardware and fasteners.

This interior placement of the seal 38 also reduces the clutter around the exhaust system and allows for more flexibility when designing the layout of other system components. Interior placement also eliminates the concern of a seal causing injuries while servicing the engine.

An alternative embodiment for placement of the seal 38 is depicted in FIG. 4. In the figure, the seal 38 is located on the outer diameter 22 of the male part 12. Specifically, it is located between the ring 24 on the outer diameter 22 of the male part 12 and the end 26 of the female part 14. This location allows for the use of lower-cost metal alloys due to the lower operating temperatures and convective cooling that is available through the joint parts.

Figure 6:
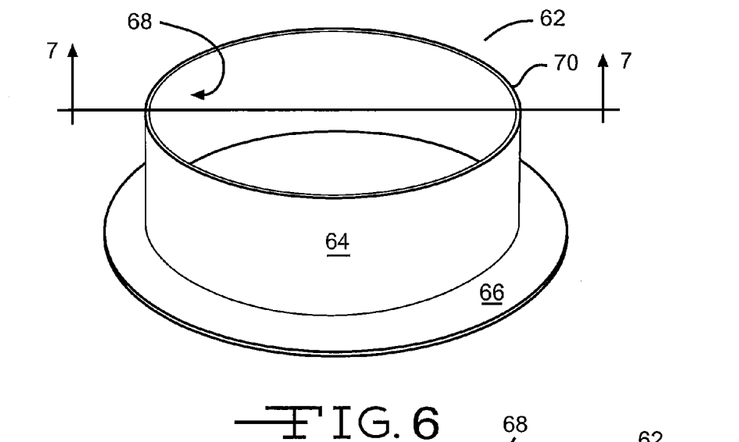
FIG. 6 is a perspective view of the carrier.
Figure 7:
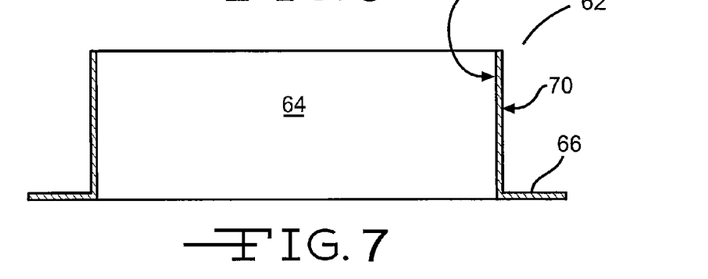
FIG. 7 is a cross-sectional view of the carrier along line 8-8.

Yet another embodiment is depicted in the FIG. 5. In this embodiment the seal 38 is located similarly to FIG. 1, but the seal 38 is accompanied with and supported by a carrier 62. The carrier 62, as depicted in FIGS. 6 and 7 is comprised of a tubular portion 64 and an upstanding flange portion 66. The tubular portion 64 has a substantially constant inner diameter 68 and outer diameter 70. The flange portion 66 is unitary with the tubular portion 64 and extends radially outward from the tubular portion 64 at approximately 90 degrees. The carrier 62 may be solid metal or have notches designed to allow for a variety of manufacturing processes. By way of example, the carrier 62 may be made of 304 stainless steel.

The seal 38 may be held in place with the aid of the carrier 62 and installed on the interior of the slip joint, as depicted in FIG. 5. The carrier 62 as shown in FIG. 8 assists in properly locating the seal 38 and it functions as a hot gas barrier to route the bulk of the gas past the seal 38 and from entering the slip joint area.

Figure 8:
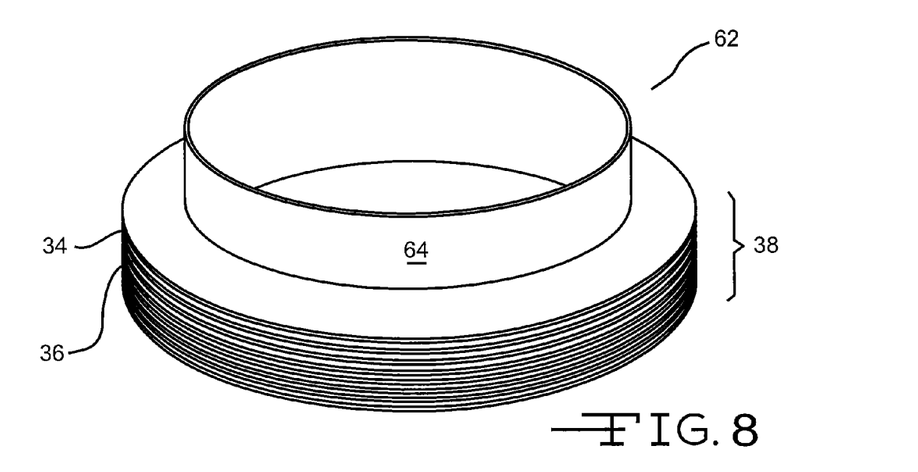
FIG. 8 is a perspective view of the carrier with stacked washer seal.

The carrier 62 aids in installation of the seal 38 by holding the washers 34 and shims 36 together in the correct orientations, as shown in FIGS. 8 and 10. The seal 38 is located around the tubular portion 64 of the carrier 62. The seal 38 has the same, or approximately the same, outer diameter as the flange portion 66 of the carrier 62. The inner diameter 72 of the washers 34 and the inner diameter 74 of the shims are substantially equal to the outer diameter 70 of the tubular portion 64 of the carrier 62, as depicted in FIG. 9. The carrier 62 provides a means to locate the washers 34 and shims 36 with respect to their internal diameters 72, 74, therefore making the design more flexible and allowing for the installation in slip joints with wider machining tolerances. As depicted in FIG. 5, the seal 38 abuts the flange portion 66 of the carrier 62 and the transition area 32 of the female part 14.

When pressure is applied to the seal 38, there is the possibility that the washers 34 and shims 36 may shift radially to one another. This concentricity shift is depicted in FIG. 11. The figure depicts a partial cross section of washers 34a, b and a shim 36a. Here the layers are shown with some concentricity shift. Any shifting in the layers reduces the seals 38 ability to prevent exhaust gases from escaping between the two parts 12, 14.

Based on FIG. 12, it can be appreciated that the washers 34a, b may have flattened edges. The flattened edges may be located either at the first end 44a, b or the second end 46a, b of the washers 34a, b. The flattened edges allow the washers 34a, b to maintain excellent sealing contact during concentricity shifts.

In FIG. 13, two washers 34a, b are shown with flattened edges and a curved feature to prevent concentricity shifts. Again, the flattened edges may be located either at the first end 44a, b or the second end 46a, b of the washers 34a, b with the curved end being located on the opposite end. In this embodiment, shifting is reduced due to the flattened end of one washer abutting the curved end of another washer.

The washer designs shown feature many advantages over the prior art. The designs provide for a very high recovery, low load design that optimizes performance in high thermal growth conditions.

Figure 14:
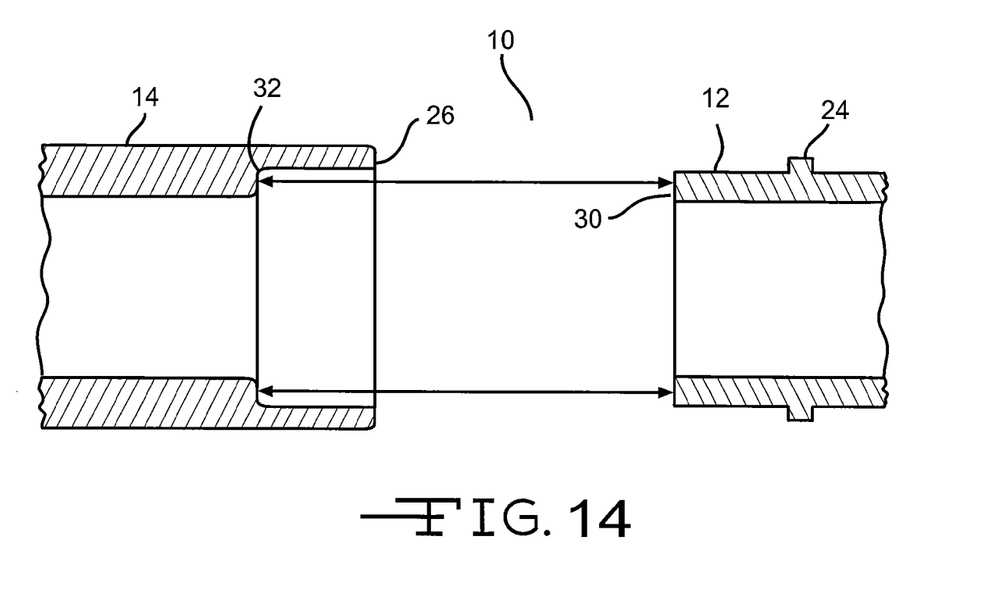
FIG. 14 is a cross-sectional view of a slip joint.

In each of the foregoing embodiments, the seal 38 functions, in part, by deploying an axial load against hardware stops and/or ends. This axle loading forces the seal 38 against the stops to prevent any leakage of gas from escaping between the two parts 12, 14. FIG. 14 depicts one embodiment of the parts 12, 14 with existing stops 24, 26, 30, 32. As previously discussed, the stops 24, 26, 30, 32 prevent the male part 12 from moving too far with respect to the female part 14. It is also within the scope of the invention for the stops to be any shape. They may also be located anywhere on the parts so as to adjust the mating relationship between the parts, as may be required by each application. Alternatively, the stops may or may not be a part of the parts to be joined.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A slip joint, comprising:
a first male part and a second female part, wherein said female part has a small inner diameter portion and a large inner diameter portion, said diameter portions are unitary with one another and directly beside one another, said male part comprises substantially constant inner and outer diameters, said male inner diameter is substantially equal to said small inner diameter portion of said female part, said male part comprises a ring located on said outer diameter, one end of said male part is located within an end of said female part, a gap is located between said male part and said female part;

at least two washers and at least one flat shim are located in said gap, said washers and said flat shim each comprise a first side, a second side, a first end and a second end, said first side of a first washer abuts an end of said male part and said second side of said first washer is in direct contact with a first side of said flat shim, said second side of said flat shim is in direct contact with said first side of a second washer, said second side of said second washer is in direct contact with a first side of a second flat shim or an abutting end of said female part; and a carrier, wherein said carrier comprises a tubular portion and an upstanding flange portion, said tubular portion has a substantially constant inner and outer diameter, an inner diameter of said washers and an inner diameter of said shim are substantially equal to and adjacent said outer diameter of said tubular portion, said flange portion is unitary with said tubular portion and extends radially outward from the tubular portion at approximately 90 degrees.

2. A slip joint according to claim 1, wherein each of said male and female parts are tubular with a hollow interior.

3. A slip joint according to claim 1, wherein said male part and said female part are for an exhaust system of an internal combustion engine.

4. A slip joint according to claim 1, wherein said gap is located between an end of said male part and a transition area between said small inner diameter portion and said large inner diameter portion of said female part.

5. A slip joint according to claim 1, wherein a second gap is located between said ring on said male portion and an end of said larger inner diameter portion of said female part.

6. A slip joint according to claim 1, wherein said washers are Belleville washers.

7. A slip joint according to claim 1, wherein said washers are arranged in a series configuration.

8. A slip joint according to claim 1, wherein said first end of each of said washers and said first end of said flat shim are in direct contact with each other.

9. A slip joint according to claim 1, wherein a selective gap is located between said second end of each of said washers and said second end of said flat shim.

10. A slip according to claim 1, wherein said second end of each of said washers and said second end of said flat shim are in direct contact with each other.

11. A slip joint slip joint according to claim 1, wherein a selective gap is located between said first end of each of said washers and said first end of said flat shim.

12. A slip joint according to claim 1, wherein said carrier is 304 stainless steel.

13. A slip joint according to claim 1, wherein said washers and flat shim are located around the tubular portion of said carrier.

14. A slip joint according to claim 1, wherein the outer diameter of said washers are substantially equal to the outer diameter of said flange portion of said carrier.

15. A slip joint according to claim 1, wherein an inner diameter of said washers are substantially equal to the outer diameter of said tubular portion of said carrier.

* * * * *